(12) United States Patent
Zettner et al.

(10) Patent No.: US 12,469,081 B1
(45) Date of Patent: *Nov. 11, 2025

(54) SYSTEMS AND METHODS FOR ADMINISTRATING A CERTIFICATE OF DEPOSIT

(71) Applicant: United Services Automobile Association, San Antonio, TX (US)

(72) Inventors: Steven Dale Zettner, San Antonio, TX (US); Destiny Williams, San Antonio, TX (US); Alphonse Damas, Columbus, OH (US)

(73) Assignee: United Services Automobile Association, San Antonio, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/638,380

(22) Filed: Apr. 17, 2024

Related U.S. Application Data

(63) Continuation of application No. 16/939,618, filed on Jul. 27, 2020, now Pat. No. 11,995,723, which is a continuation of application No. 14/267,423, filed on May 1, 2014, now Pat. No. 10,762,567.

(51) Int. Cl.
*G06Q 40/06* (2012.01)

(52) U.S. Cl.
CPC .................. *G06Q 40/06* (2013.01)

(58) Field of Classification Search
CPC ........................................ G06Q 40/06
See application file for complete search history.

(56) References Cited

U.S. PATENT DOCUMENTS

| | | | |
|---|---|---|---|
| 5,819,263 | A | 10/1998 | Bromley et al. |
| 7,395,232 | B1 | 7/2008 | Pilato |
| 10,762,567 | B1 | 9/2020 | Zettner et al. |
| 2004/0138983 | A1 | 7/2004 | Nishimaki |

(Continued)

FOREIGN PATENT DOCUMENTS

| | | | | |
|---|---|---|---|---|
| CA | 2509179 A1 | * | 11/2005 | ............. G06Q 40/06 |
| EP | 1102224 A2 | * | 5/2001 | ............. G07F 19/20 |

OTHER PUBLICATIONS retirementegg.com: CD Redemption Features, Aug. 15, 2011, pp. 1-2 (Year: 2011).*

(Continued)

*Primary Examiner* — Bijendra K Shrestha
(74) *Attorney, Agent, or Firm* — Plumsea Law Group, LLC

(57) ABSTRACT

A method for administrating a certificate of deposit (CD) includes receiving an option agreement entered into by a user with a financial institution. The option agreement defines one or more predetermined events enabling disposition of funds of a CD prior to the CD's maturity date. The option agreement has a fee associated therewith. The received option agreement and one or more services provided to the user by the financial institution are analyzed by a processor to determine said user's eligibility for disposition of CD funds prior to the maturity date based on an occurrence of the one or more predetermined events specified by the option agreement. The occurrence of the one or more predetermined events is verified, using the processor. A recommendation is provided to the user to dispose the CD funds in response to verifying the occurrence of the one or more predetermined events.

18 Claims, 6 Drawing Sheets

(56) References Cited

U.S. PATENT DOCUMENTS

| | | | |
|---|---|---|---|
| 2005/0108154 A1 | 5/2005 | McLiesh et al. | |
| 2005/0160019 A1 | 7/2005 | Cluse et al. | |
| 2005/0289037 A1 | 12/2005 | Smith et al. | |
| 2005/0289049 A1 | 12/2005 | Schuver et al. | |
| 2008/0262956 A1 | 10/2008 | De La Motte | |
| 2008/0319885 A1* | 12/2008 | D'Anna | G06Q 40/00 705/35 |
| 2010/0268668 A1 | 10/2010 | Burdette | |
| 2011/0125652 A1 | 5/2011 | Sato et al. | |
| 2012/0310858 A1* | 12/2012 | Stanley | G06Q 40/06 705/36 R |

OTHER PUBLICATIONS

West, Michael: Certificate of Deposit, Apr. 5, 2012, Raymond James, pp. 1-5 (Year: 2012).*

Deng et al.: Structured Certficate of Deposit: Introduction and Valuation, Jul. 30, 2013, Securities Litigation & Consulting Group, pp. 1-22 (Year: 2013).*

Kutner, G.W., Jr. (1984). An Empirical Analysis Of Risk Premiums In The Negotiable Certificate Of Deposit ?Market From 1978 To 1981 (Order No. 8411161). Available from ProQuest Dissertations & Theses Global. ?? (303312352). Retrieved from https://search.proquest.corn/docview/303312352accountid=14753 ?

Adams, P. D. (1982). An Economic Analysis Of Certificates Of Deposit: Early Withdrawal Options (Order No. ?? 8300195). Available from ProQuest Dissertations & Theses Global. (303245893). Retrieved from ?https://search.proquest.corn/docview/303245893 accountid=14753?

Rossman, J. E., Jr. (1975). A Study Of The Use Of Negotiable Certificates Of Deposits By Large U.s. Banks ?To Satisfy Liquidity, Profitability, And Soundness Needs (Order No. 7609196). Available from ProQuest ?Dissertations & Theses Global. (302738173). Retrieved from ?https://search.proquest.corn/docview/302738173ac ?

Goldstein, S. (1984). Banking and communications in an electronic age contemporary issues of law, policy and ? regulation (Order No. NL24049). Available from ProQuest Dissertations & Theses Global. (249904220). ?Retrieved from https://search.proquest.com/ docview/ 249904220accountid =14753?

* cited by examiner

SYSTEMS AND METHODS FOR ADMINISTRATING A CERTIFICATE OF DEPOSIT

This application is a Continuation of U.S. patent application Ser. No. 16/939,618 filed Jul. 27, 2020, which is a Continuation of U.S. patent application Ser. No. 14/267,423 filed May 1, 2014, which is incorporated herein by reference in its entirety.

FIELD OF THE INVENTION

The present disclosure relates generally to financial instruments, and more particularly, to electronically administrating a certificate of deposit.

BACKGROUND OF THE INVENTION

A certificate of deposit (CD) is a time deposit, a financial product commonly offered to consumers by banks, thrift institutions, and credit unions. Such CDs are similar to savings accounts in that they are insured and thus virtually risk-free. A CD has a specific, fixed term (often three months, six months, or one to five years), and, usually, a fixed interest rate. It is intended that the CD be held until maturity, at which time the money may be withdrawn together with the accrued interest.

Withdrawals before maturity are usually subject to a substantial penalty. For a five-year CD, this is often the loss of six months' interest. These penalties ensure that it is generally not in a holder's best interest to withdraw the money before maturity-unless the holder has another investment with significantly higher return or has a serious need for the money.

However, there are many variations in the terms and conditions for CDs. Managing the CDs may be complex and time consuming. Additionally, people may have difficulty determining whether they can access CD funds in emergency situations without incurring the harsh early disposition penalty.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a computer-implemented method for administrating a certificate of deposit (CD) is provided. An option agreement entered into by a user with a financial institution is received. The option agreement defines one or more predetermined events enabling disposition of funds of a CD prior to the CD's maturity date. The option agreement has a fee associated therewith. The received option agreement and one or more services provided to the user by the financial institution are analyzed by a processor to determine said user's eligibility for disposition of CD funds prior to the maturity date based on an occurrence of the one or more predetermined events specified by the option agreement. The occurrence of the one or more predetermined events is verified, using the processor. A recommendation is provided to the user to dispose the CD funds in response to verifying the occurrence of the one or more predetermined events.

In another aspect, a computer system for administrating a certificate of deposit (CD) comprises one or more processors, one or more computer-readable storage devices, and a plurality of program instructions stored on at least one of the one or more storage devices for execution by at least one of the one or more processors. The plurality of program instructions includes program instructions to receive an option agreement entered into by a user with a financial institution. The option agreement defines one or more predetermined events enabling disposition of funds of a CD prior to the CD's maturity date. The option agreement has a fee associated therewith. The plurality of program instructions further includes program instructions to analyze the received option agreement and one or more services provided to the user by the financial institution to determine said user's eligibility for disposition of CD funds prior to the maturity date based on an occurrence of the one or more predetermined events specified by the option agreement. The plurality of program instructions further includes program instructions to verify the occurrence of the one or more predetermined events. The plurality of program instructions further includes program instructions to provide a recommendation to the user to dispose the CD funds in response to verifying the occurrence of the one or more predetermined events.

BRIEF DESCRIPTION OF THE DRAWINGS

The accompanying appendices and/or drawings illustrate various non-limiting, examples, inventive aspects in accordance with the present disclosure.

DETAILED DESCRIPTION OF CERTAIN EMBODIMENTS

Figure 1:
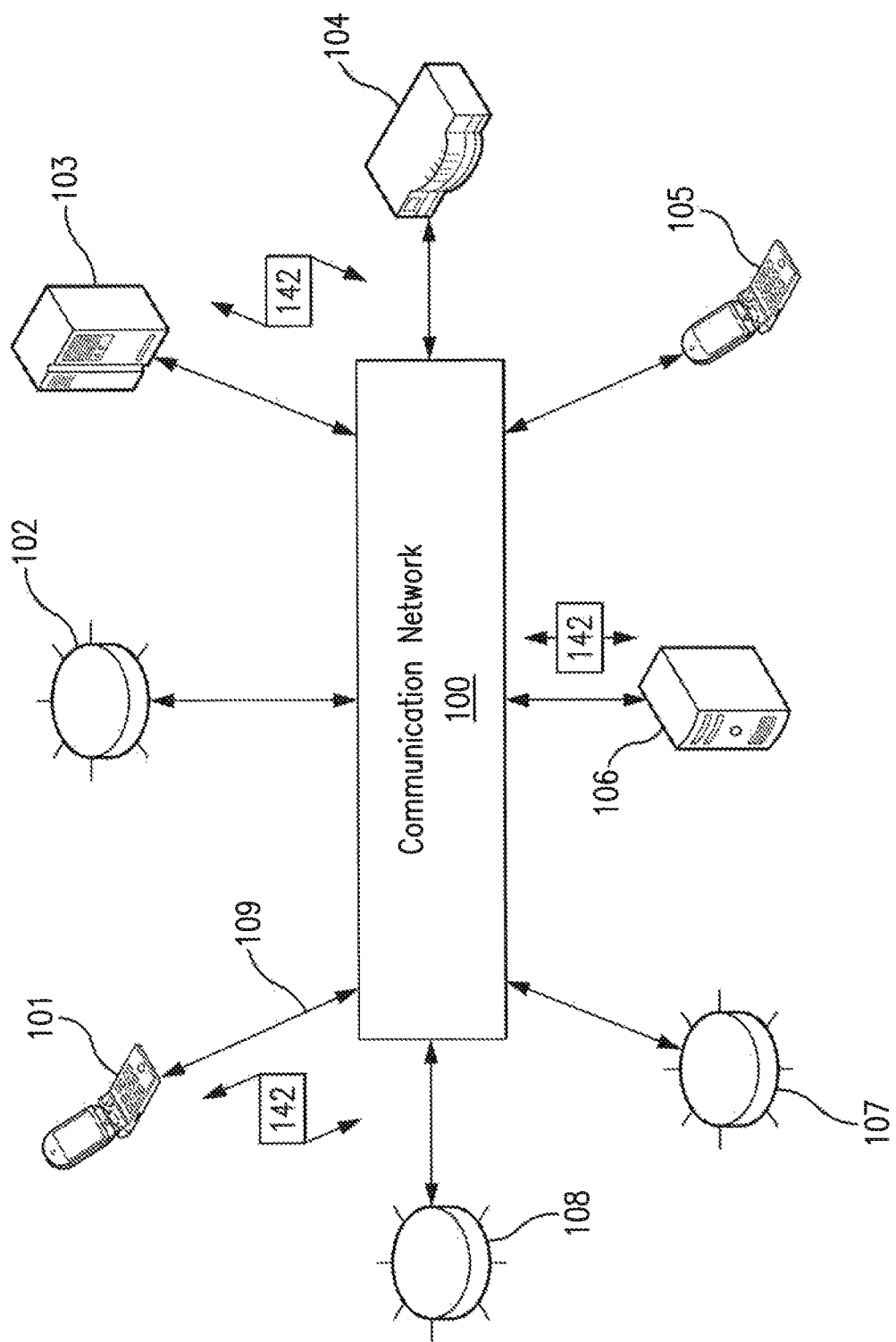
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

As used herein, the term "user" refers to individuals such as established institution members, prospective members, or other CD holders that interact with institution using a telecommunication device.

As indicated above, embodiments of the present invention include a method, system, and computer program product that can be used to electronically administer and process a certificate of deposit. In some embodiments, users may enter into an option agreement with an institution. This option agreement may enable users to access their CD funds prior to CD's maturity date with no occurrence of penalty in case a predetermined life changing event occurs in user's life. Based on the analysis of the option agreement and other services provided to the user by the institution, the institution system preferably verifies the occurrence of the event and provides a recommendation to dispose CD funds.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

An exemplary communication network 100 depicted in FIG. 1 illustratively comprises nodes/devices 101-108 (e.g., sensors 102, institution system 103, smart phone devices 101, 105 computing devices 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

Figure 2:
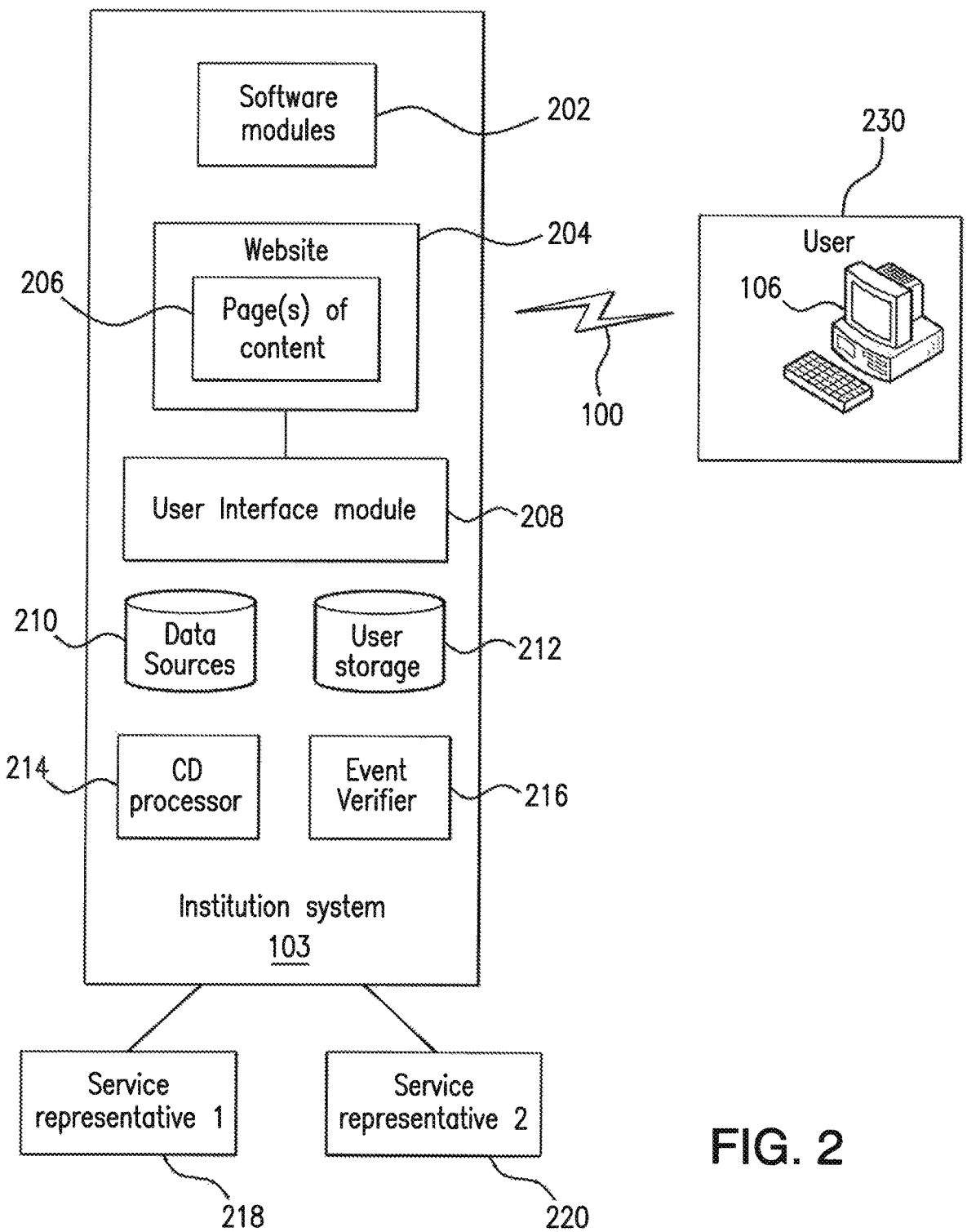
FIG. 2 is a block diagram of an exemplary system that may be used to facilitate an electronic administration of a certificate of deposit in accordance with an exemplary embodiment of the present invention.

FIG. 2 is a block diagram of an exemplary system that may be used to facilitate an electronic administration of a certificate of deposit in accordance with an exemplary embodiment of the present invention. An institution system 103, associated with or otherwise maintained by an institution such as a financial services institution, may include a CD processor 214 that may be used for electronically administrating one or more CDs associated with a user 230. The user 230 may communicate with the institution system 103 using a computing device 106. The CD processor 214 may retrieve user's information from storage, such as user storage 212, and may use the information in processing the request to analyze the one or more user's CDs. The CD processor 214 may evaluate and verify user information (e.g., the personal information and the financial information pertaining to the user) and may provide financial advice and/or recommendations for the user 230 related to early access of CD funds. The CD processor 214 may also store information pertaining to the user's CDs and/or provided recommendation in storage, such as user storage 212.

An event verifier 216 may be operatively interconnected with the CD processor 214 and may be configured to verify an occurrence of one or more qualifying lifestyle changing events, upon receiving user's consent. The event verifier 216 may receive information from the user 230 via the user computing device 106, the CD processor 214 and from user storage 212, for example. In addition, according to an embodiment of the present invention, the event verifier 216 may receive information from third party data sources, such as various service providers and governmental agencies to confirm an occurrence of the one or more qualifying lifestyle changing events, as discussed below in conjunction with FIG. 3.

User storage 212 may contain information pertaining to users who have accounts or products hosted by the institution system 103, for example. User storage 212 may contain information directed to users, such as name, address, marital status, account information, products owned, etc., for example. In addition, user storage 212 may include data (e.g., an option agreement entered into by the user and financial institution) that may be used to process CDs and to determine user's eligibility for early CD access (prior to its maturity date) with no occurrence of penalty fees.

The event verifier 216 may generate and provide a questionnaire to the user 230 that requests additional information from the user 230 pertaining to an occurrence of the lifestyle changing event, information pertaining to a third party capable of confirming the occurrence of the event, and the like. The questionnaire may be pre-filled or personalized with data already known to the institution system 103. The institution system 103 may generate a recommendation related to early disposal of CD funds based, at least in part, on the questionnaire.

Information directed to CDs and CD administration may be provided via a website 204 to the user computing device 106 associated with the user 230. In an alternative embodiment of the present invention, instead of hosting the website 204, the institution system 103 may comprise a conventional application server hosting a proprietary online service accessible only by a private network. In any event, the institution system 103 may have appropriate security mechanisms in place to prevent unauthorized third parties from intercepting the user's information.

The user 230 may provide data to the institution system 103 via the user computing device 106. Although in FIG. 2 the computing device 106 is illustrated in the form of a desktop computer, in various embodiments of the present invention the user computing device 106 may be a handheld computing device, such as a smartphone, laptop, tablet computer, or any other suitable device.

As described further herein, one of the service representatives 218, 220 associated with the institution system 103 may confer with the user 230 about CD processing. Such a conference may be via an Internet chat session or a telephone, for example. Although, only two service representatives 218, 220 are shown in FIG. 2, it is contemplated that any number of service representatives 218, 220 may be associated with the institution system 103.

In an embodiment of the present invention, a user interface module 208 may receive content from the event verifier 216 or the CD processor 214 and format one or more pages of content 206 as a unified graphical presentation that may be provided to the user computing device 106. The page(s) of content 206 may be directed to aforementioned questionnaire and/or other CD-related information and may be provided to the user computing device 106 via the website 204 associated with the institution system 103. It will be appreciated that, in an embodiment, a service representative 218, 220 of the institution may access the user interface module 208, or the underlying questionnaire information, to assist the user 230 with any questions the user may have and/or to confirm the accuracy of the information provided by the user 230, for example.

When the user 230 accesses the website 204, using a web browser on the user computing device 106, he/she may be presented with financial services information such as CD information, option agreement information and/or questionnaire information via the page(s) of content 206. The information may be displayed in one or more web pages, for example. The user 230 may enter information into the presented questionnaire and/or other web pages via a web browser on the user computing device 106.

The content of the questionnaire may be personalized to the user 230, using information retrieved from the user storage 212, for example. Personalization may include presentation of the page(s) of content 206 and/or functionality of the page(s) of content 206. For example, a questionnaire displayed on the page(s) of content 206 may be pre-filled with some information pertaining to the user, such as name, address, policy number, qualifying event type, etc. In an embodiment of the present invention, personalization may be directed to CDs and/or other products that the user may own, and may provide specific information on the user's CD, option agreement and/or other products, such as amounts, maturity dates, interest rates, one or more predefined events (qualifying events) that would enable penalty-free early disposition of CD funds, and the like. In another embodiment, the option agreement may be directed to one or more additional CDs associated with one or more third party. In this embodiment, the graphical representation of the page(s) of content 206 may include information directed to those CDs owned by one or more third party. It is noted that personalization is not limited to CD or questionnaire and may be directed to any type of data, information, product, service, advertisement, etc.

In an embodiment of the present invention, the user may be provided with one or more questionnaire and/or one or more additional documents online, via the website 204 or via email, for example, that he/she can electronically sign. Any known electronic signature technique may be used. The user 230 may electronically sign the questionnaire and/or one or more additional documents and provide them electronically to the institution system 103 via email or the website 204, for example.

In an embodiment of the present invention, the institution system 103 may be implemented as a web server. The user access system, through the use of any suitable interactive web technology, may provide an interactive experience to the user 230 through which access to administration of his/her financial instrument(s) and/or financial recommendation can be accomplished. Any technology that provides interactivity through a web browser is considered to be within the scope of the present invention and may include, without limitation, Hyper-Text Mark-up Language (HTML), Dynamic HTML (DHTML), JavaScript and Ajax.

In an embodiment, the institution may be a financial services institution (e.g., such as USAA, or any other entity providing financial services) having a financial services website. On the website 204, in a common space, the user 230 may be presented with financial advice such as a recommendation to access CD funds in emergency situations.

In an embodiment of the present invention, the institution system 103 may comprise one or more additional software modules 202. The software modules 202 may be used in the performance of the techniques and operations described herein and may be operatively coupled to the CD processor 214 and event verifier 216 modules. Example software modules may include, without limitations, modules for sending and receiving information between the institution system 103 and the user 230, requesting and retrieving information from user storage 212, and generating web pages described herein. While specific functionality is described herein as occurring with respect to specific modules, the functionality may likewise be performed by more, fewer, or other modules. The functionality may be distributed among more than one module. An example computing device and its components are described in more detail with respect to FIG. 6.

Figure 3:
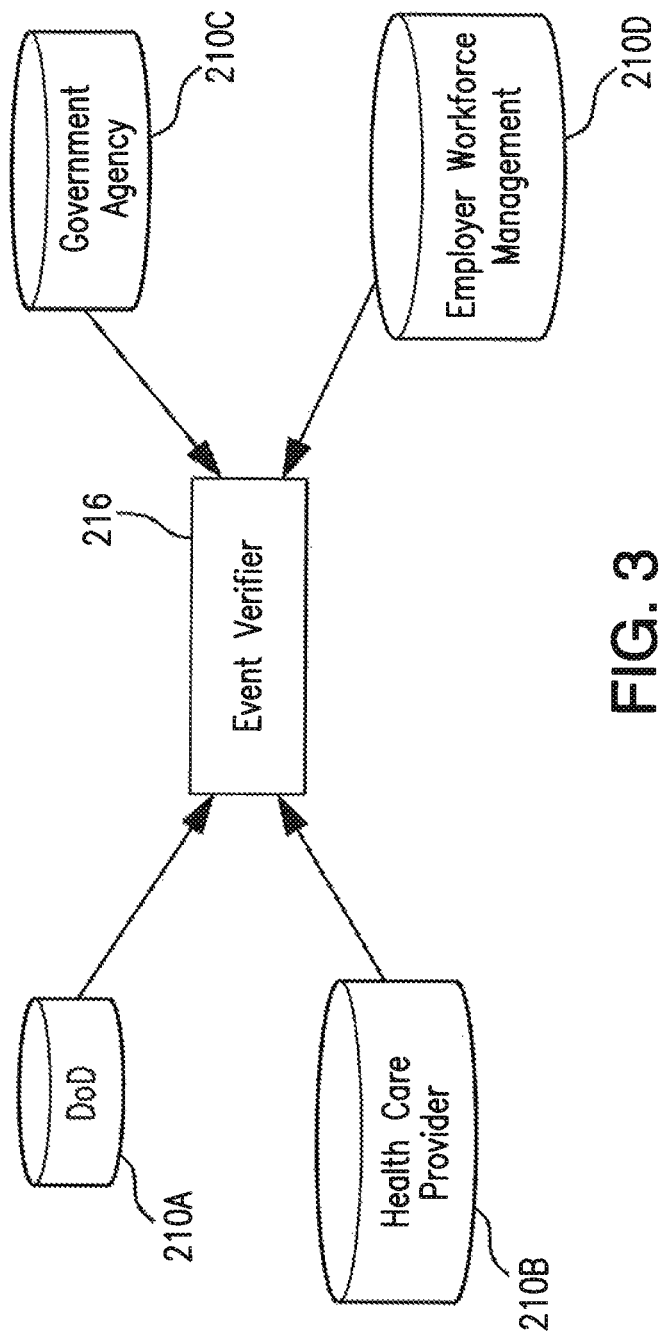
FIG. 3 illustrates an exemplary event verifier module of FIG. 2 operatively interconnected with a plurality of third party-related data sources in accordance with an exemplary embodiment of the present invention.

FIG. 3 illustrates that various embodiments of event verifier module 216 may be integrated with a variety of third party systems and data sources to query and correlate information. Some of the data sources may include, but are not limited to, Department of Defense (DoD) 210A and other government agency 210C systems, health care provider's records 210B and employers' workforce management system 210D, as shown in FIG. 3. As previously indicated, an option agreement entered into by the user 230 and the financial institution may define certain qualifying life events that may present an opportunity to the user 230 to access CD funds without any penalty. Qualifying life events may include, without limitation, the birth of a child, adoption, divorce, marriage, health-related issue, military deployment, loss of insurance coverage, death of a dependent, change in employment status, and the like.

As an example, the user 230 may indicate in the aforesaid questionnaire that his/her military deployment status has changed. According to an embodiment of the present invention, if the option agreement includes military deployment as the qualifying life event, event verifier module 216 may access and retrieve information from the DoD data source 210A in order to confirm user's military deployment status. It is noted that since event verifier module 216 may need to request and retrieve sensitive information that may be contained in the DoD data source 210A, any known secure communication technique, such as, but not limited to, encryption may be used for communication between the event verifier 216 and DoD data source 210A.

As another non-limiting example, if the user 230 has selected a change in his/her marital status as the qualifying event in the said questionnaire, the event verifier module 216 may access appropriate government agency's information system (data source) 210C to verify the occurrence of the event. If the user indicates another qualifying event, such as illness or change in employment status, as reasons for accessing CD funds prior to its maturity date, the event verifier 216 may access a data source associated with the user's health care provider 210B (such as hospitals, labs, and physicians) or employer's workforce management system 210D to obtain appropriate information. It is noted that according to an embodiment of the present invention, event verifier 216 preferably obtains user's consent, via the service representative 218 for example, prior to accessing user's information contained in the one or more third party data sources 210A-210D shown in FIG. 3.

Figure 4:
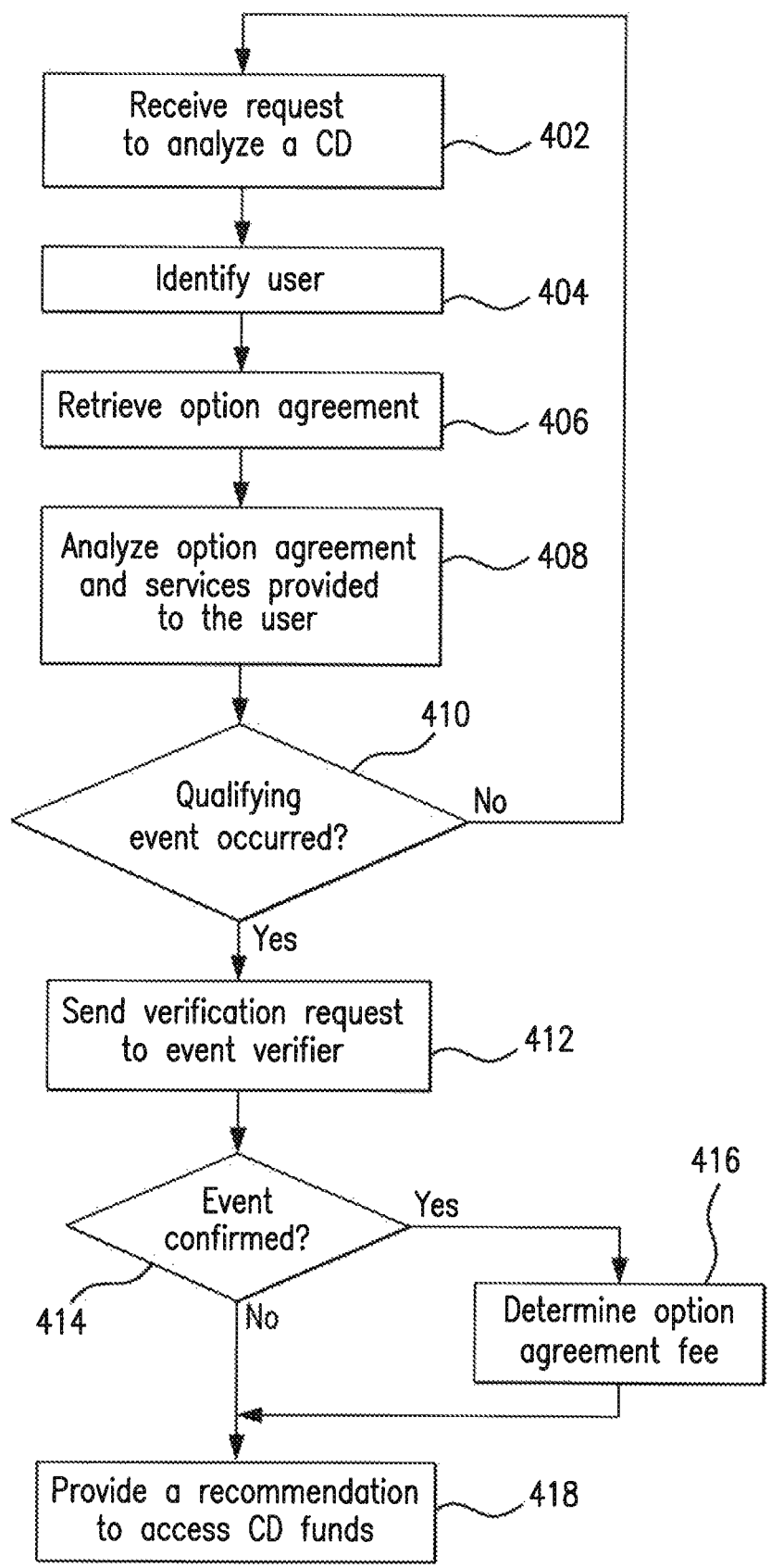
FIG. 4 is a flowchart of operational steps of the CD processor module of FIG. 2 in accordance with an exemplary embodiment of the present invention.
Figure 5:
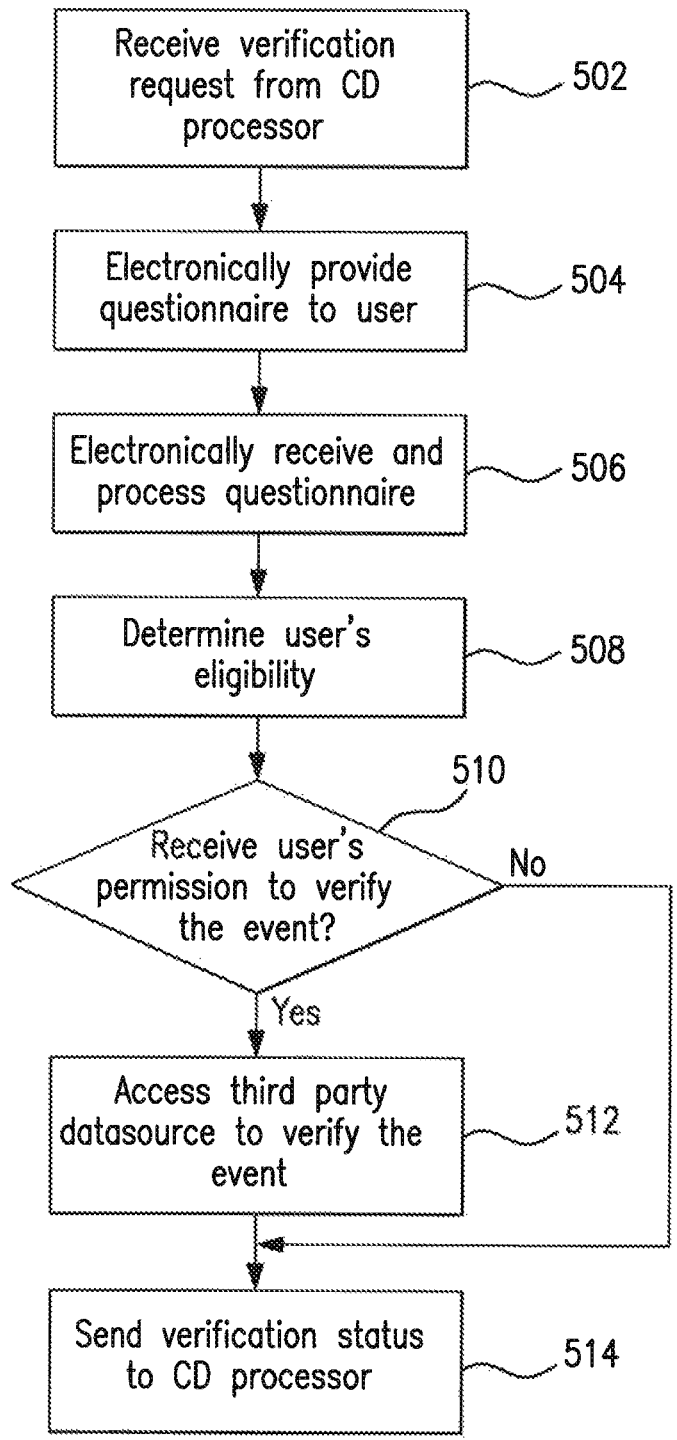
FIG. 5 is a flowchart of operational steps of the event verifier module of FIG. 2 in accordance with an exemplary embodiment of the present invention.

FIGS. 4 and 5 are flowcharts of operational steps of the CD processor module 214 and event verifier module 216 of FIG. 2 in accordance with exemplary embodiments of the present invention. Before turning to description of FIGS. 4 and 5, it is noted that the flow diagrams shown therein are described, by way of example, with reference to components shown in FIGS. 1-3, although these operational steps may be carried out in any system and are not limited to the scenario shown in the aforementioned figures. Additionally, the flow diagrams in FIGS. 4 and 5 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

As previously indicated, in certain emergency situations CD holders may have an opportunity to acquire their CD funds prior to the corresponding maturity date without incurring any penalty, which is typically associated with the early disposition of CD funds. Referring to FIG. 4, at 402, the CD processor 110 may receive a request to analyze information related to a particular user from the user interface module 208 or any other software module comprising the information system 103. For instance, an appropriate request may be triggered by the user interface module 208 in response to a user's inquiry about a particular personal loan due to ill health. In another embodiment, this request may be sent by a different software module 202 facilitating one of the online services via the website 204. Regardless of the particular online service used, the user 230 of the computing device 106 has a user ID for that online service. The user ID for that online service identifies that particular user and allows him or her to be distinguished from other users of that online service. The user can log into or sign into the online service by providing his or her identifying information to the user interface module 208, which in turn may pass the identifying information to the CD processor 214 via the request received at 402. This passing of the identifying information may be performed in a secure manner, such as by encrypting the identifying information. This identifying information can take a variety of different forms, such as a user ID and password combination, a fingerprint, a particular passphrase, a digital certificate, and so forth.

At 404, the CD processor 110 may process the received request to identify a particular user. In an embodiment of the present invention, the CD processor 110 may receive this identifying information and compare the received information to information previously stored, for example, in user storage 212. If the received and previously stored information match (e.g., are the same), then the CD processor 110 may search information pertaining to users who have accounts or products hosted by the institution system 103 to determine whether the identified user is a current CD holder and to identify a corresponding account number, for example. If the received and previously stored information do not match (e.g., are not the same), then the user is not authenticated and the CD processor 110 may send an appropriate error message back to the user interface module 232 or another software module 202.

As indicated above, in some embodiments of the present invention, users may enter into an option agreement with an institution. This option agreement may enable users to access their CD funds prior to CD's maturity date with no occurrence of penalty in case a predetermined qualifying life changing event occurs. As discussed in detail below, the option agreement may involve a variety of CD-related information. The option agreement may include a corresponding option fee, for example. This option fee may have one or more payment options associated therewith. For instance, this option fee can be paid up front, as installments during CD term or upon early CD access. At least in some option agreements, option fees may be reduced over a CD term. In other words, fee amount may be greater the further CD funds access date is from the CD maturity date. It is noted that this option fee may be waivable at the discretion of the financial institution upon occurrence of certain qualifying events (e.g., at the discretion of service representative 218, 220). The option agreement may also include a CD interest rate, which may be contingent upon the option agreement. For instance, the specified CD interest rate may be correlated to the option fee discussed above and/or to number of predefined option triggering (qualifying) events. The option agreement further includes what is herein characterized as terms and conditions (events) enabling early CD access. The life events included in the option agreement may act as enabling events for an early penalty-free disposition of funds, as described below. The option fee might be contingent upon number and types of events covered. In accordance with one embodiment of the invention, and one scenario, this option fee may be dynamically scalable. For example, the option fee amount may directly relate to the extent the qualifying event is verifiable. In some cases, the option agreement may extend to cover one or more additional CDs associated with one or more third party (i.e., user's dependents, for example).

Accordingly, if at 404 the CD processor 110 identified the user 230 as the CD holder, at 406, the CD processor may retrieve a corresponding option agreement from the user storage 212, for example. At 408, the CD processor 110 may analyze the retrieved option agreement to extract certain CD-related data, such as, for example, but not limited to, option fee amount, CD interest rate, the list of qualifying events, and the like. In addition to analyzing the retrieved option agreement, at 408, the CD processor 110 may evaluate other products or services provided by the financial institution to the identified user 230. For instance, if the user 230 has additional accounts or products (e.g., checking account, health insurance policy, etc.) hosted by the institution system 103 and if this evaluation of the checking account reveals that user's income (salary) has changed, this information in combination with the information that more generally indicates potential health issues (e.g., one or more financial transactions related to recent purchases of prescription drugs) may indicate a potential occurrence of one or more predefined qualifying events. In this step, the CD processor 110 may apply any known predictive analytics algorithm to the dataset contained in the user storage 212 to make a determination when a user is eligible to access CD funds prior to the specified maturity date without incurring the harsh early disposition penalty. According to various embodiments of the present invention, the CD processor 110 can employ various classification (explicitly or implicitly trained) schemes or systems. For instance, such classification schemes may include, but not limited to, boosting classifiers, transduction classifiers, inductive classifiers, support vector machines, neural networks, expert systems, Bayesian belief networks, fuzzy logic, data fusion engines, and the like.

Next, at 410, the CD processor 110 may determine whether the presumably occurred event is a qualifying event in compliance with the retrieved option agreement. In response to determining that the presumably occurred event is not included in the list of qualifying events (step 410, no branch) or if the option agreement does not include any events that may trigger early penalty-free CD access, the CD processor 110 may return back to step 402 and wait for the next request related to CD analysis. In response to determining that the presumably occurred event may constitute a qualifying event (step 410, yes branch), the CD processor 110, at 412, may send a request to the event verifier 216 configured and operable to perform event confirmation and/or verification, as described in more detail below with respect to FIG. 5. At 414, the CD processor may evaluate the response received back from the event verifier 216.

In response to receiving affirmative verification results from the event verifier 216 (step 414, yes branch), at 416, the CD processor 110 may calculate an option agreement fee. For example, this step may involve reducing the fee amount if the option agreement fee is dependent upon the event verification. As another example, the option agreement fee may be contingent upon the type of the qualifying event. This step may further involve a determination whether the option agreement fee should be waived by the financial institution in case of catastrophic illness, for example. According to an embodiment of the present invention, the CD processor 110 may utilize a set of rules defining how the option agreement fee should be determined.

Next, at 418, the CD processor 110 may generate a recommendation to the user 230 to access the funds associated with the user's CD prior to its maturity date. This recommendation may include information related to the option fee calculated at 416. The generated recommendation may further include information about any other product hosted by the institution system 103 (such as retirement/savings plan, for example) that may be affected by early CD disposition. According to an embodiment of the invention, the recommendation may be electronically provided to the user 230 via the website 204 or email, for example.

FIG. 5 is a flowchart of operational steps of the event verifier module of FIG. 2 in accordance with an exemplary embodiment of the present invention. The event verifier 216 may be operatively interconnected with the CD processor 214 and may be configured to verify an occurrence of one or more qualifying events, upon receiving user's consent. At 502, the event verifier 216 may receive a verification request from the CD processor 110. The verification request may include user's identifying information and the type of the presumably occurred event.

At 504, the event verifier 216 may provide a questionnaire to the user 230. The questionnaire may request information from the user 230 that may be analyzed and used to further determine whether the presumably qualifying event has actually occurred and to determine whether any third party (i.e., service provider) may corroborate the event occurrence (e.g., the questionnaire may ask questions about a time frame during which the event took place and one or more event attributes). Prior to providing the questionnaire to the user 230, the event verifier 216 may pre-fill or personalize the questionnaire with financial and/or personal data that is known to the institution system 103 about the user 230, such as the user's name, known CDs, and a type of the qualifying event that has presumably occurred, for example. This information may be provided to the event verifier 216 by CD processor 110 in the verification request received at 502. Alternatively, the event verifier 216 may retrieve this information from storage associated with the institution system 103, such as user storage 212.

The event verifier 216 may electronically provide the questionnaire to the user 230 via the website 204 or email, for example. The user 230 may then fill out the questionnaire, responding to any questions or requests for information contained in the questionnaire, and electronically provide the filled out questionnaire back to the event verifier 216 at 506. The user 230 may provide responses to the questionnaire that contain information about the event. For example, if the CD processor 210 has presumed a health-related issue to be the qualifying event, the user 230 may provide responses to the questionnaire that contain information about the user's illness, such as a medical diagnosis, name and/or contact information of the health care provider, details regarding user's visit, details regarding treatment, prescriptions, and/or other information. The user 230 may provide the questionnaire to the event verifier 216 via the website, email, or any other electronic means. The event verifier 216 may process the received information (at 506).

In one embodiment of the present invention, at 508, the event verifier 216 may determine whether the occurred event constitutes a qualifying event defined by the option agreement and whether the user 230 is still eligible for early penalty-free access to CD funds. This determination may be made by the event verifier 216 based on the information in the user's response to the questionnaire. In addition, at 508, one of the service representatives 218, 220 may contact the user to discuss the qualifying event, to confirm accuracy of the provided information and to obtain user's consent to contact the service provider for verification purposes. Such a conference may take place by telephone or via an Internet chat session, for example, and may be initiated by the user 230 or service representative 218, 220. It is contemplated that such a conference may be optional if the user 230 provides an electronic consent to contact a third party service provider.

At 510, the event verifier 216 may determine whether the user 230 has provided his or her consent either electronically or via the service representative 218, 220. In response to the determined grant of consent (step 510, yes branch), at 512, the event verifier 216 may establish a communication session with an appropriate data source from the plurality of data sources 210A-210D it may be integrated with. For instance, the event verifier 216 may contact health care provider's database 210B maintaining patients' data and query specific information related to the occurred event. If information provided by the third party data source (i.e., health care provider's database 210B) matches information provided by the user 230 in questionnaire, at 514, the event verifier 216 may send a positive verification status to the CD processor 214. If the retrieved information does not match the information provided by the user 230 or in response to the user's denial of the prompted consent (step 510, no branch), at 514, the event verifier 216 may send a negative verification status to the CD processor 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
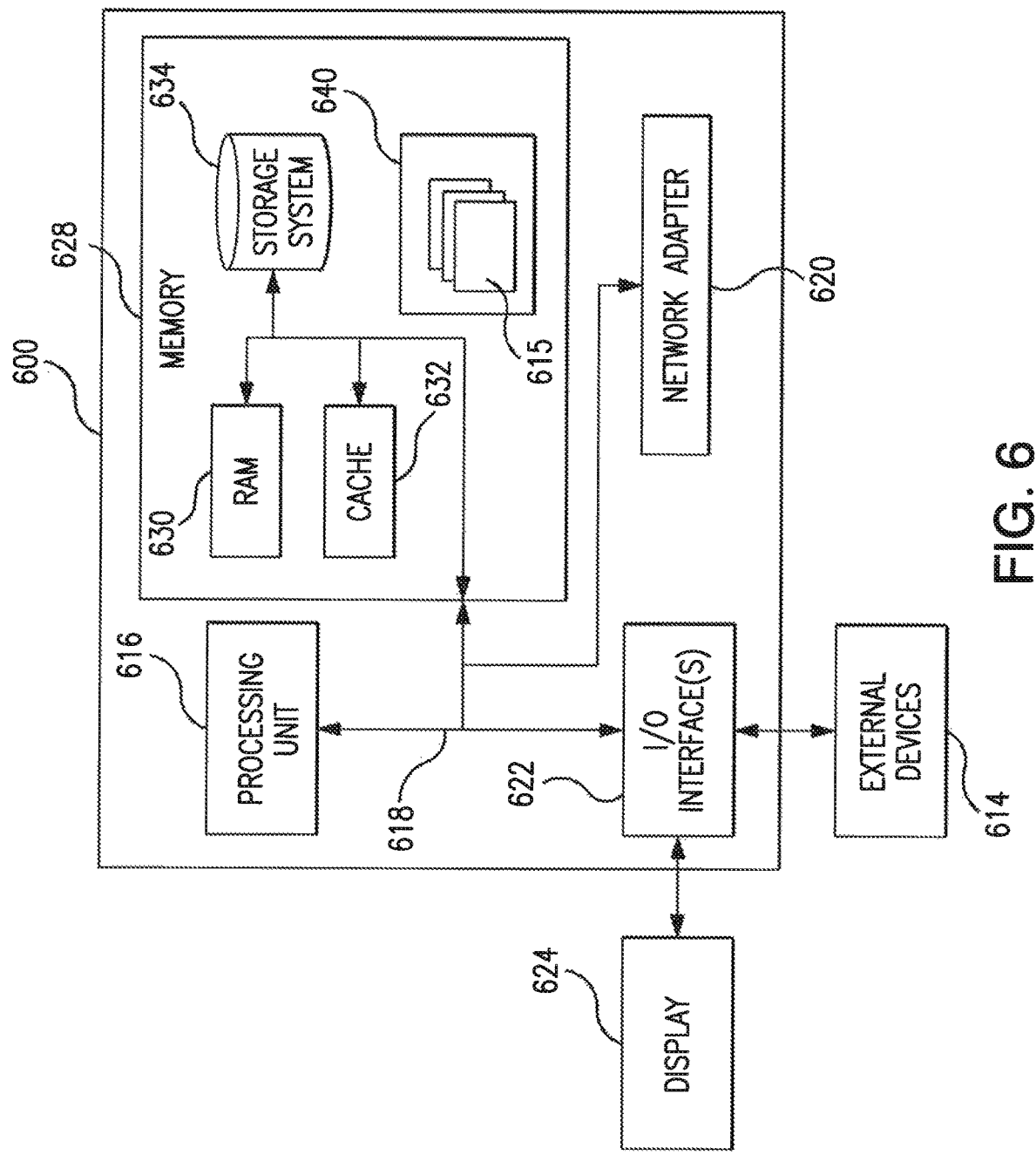
FIG. 6 illustrates a typical computing system that may be employed to implement some or all processing functionality in accordance with an exemplary embodiment of the present invention.

FIG. 6 is a schematic block diagram of an example network computing device 600 (e.g., institution system 103) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 600 is intended to represent any type of computer system capable of carrying out the teachings of various embodiments of the present invention. Device 600 is only one example of a suitable system and is not intended to suggest any limitation as to the scope of use or functionality of embodiments of the invention described herein. Regardless, computing device 600 is capable of being implemented and/or performing any of the functionality set forth herein.

Computing device 600 is operational with numerous other general purpose or special purpose computing system environments or configurations. Examples of well-known computing systems, environments, and/or configurations that may be suitable for use with computing device 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 600 may be described in the general context of computer system-executable instructions, such as program modules, being executed by a computer system. Generally, program modules may include routines, programs, objects, components, logic, data structures, and so on that perform particular tasks or implement particular abstract data types. Computing device 600 may be practiced in distributed data processing environments where tasks are performed by remote processing devices that are linked through a communications network. In a distributed data processing environment, program modules may be located in both local and remote computer system storage media including memory storage devices.

Device 600 is shown in FIG. 6 in the form of a general-purpose computing device. The components of device 600 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 600 typically includes a variety of computer system readable media. Such media may be any available media that is accessible by device 600, and it includes both volatile and non-volatile media, removable and non-removable media.

System memory 628 can include computer system readable media in the form of volatile memory, such as random access memory (RAM) 630 and/or cache memory 632. Computing device 600 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 615, such as CD processor 214 and event verifier 216 described above, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 615 generally carry out the functions and/or methodologies of embodiments of the invention as described herein.

Device 600 may also communicate with one or more external devices 614 such as a keyboard, a pointing device, a display 624, etc.; one or more devices that enable a user to interact with computing device 600; and/or any devices (e.g., network card, modem, etc.) that enable computing device 600 to communicate with one or more other computing devices. Such communication can occur via Input/Output (I/O) interfaces 622. Still yet, device 600 can communicate with one or more networks such as a local area network (LAN), a general wide area network (WAN), and/or a public network (e.g., the Internet) via network adapter 620. As depicted, network adapter 620 communicates with the other components of computing device 600 via bus 618. It should be understood that although not shown, other hardware and/or software components could be used in conjunction with device 600. Examples, include, but are not limited to: microcode, device drivers, redundant processing units, external disk drive arrays, RAID systems, tape drives, and data archival storage systems, etc.

FIG. 6 is intended to provide a brief, general description of an illustrative and/or suitable exemplary environment in which embodiments of the above described present invention may be implemented. FIG. 6 is exemplary of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for administrating a certificate of deposit associated with a financial institution for a user, the method comprising the steps of:
    receiving, in a first software module by a processor, user entered data from a user's smart phone, wherein the first software module is configured to identify one or more predetermined qualifying events for disposing funds of a certificate of deposit prior to a maturity date of the certificate of deposit, wherein the one or more predetermined qualifying events comprise one or more qualifying life events;
    receiving, in a second software module by the processor, encrypted data of the user entered data from the first software module;
    analyzing and decrypting, in the second software module by the processor without user intervention, the received encrypted data, to determine the user's eligibility for disposition of funds of the certificate of deposit prior to the maturity date, without penalty fees, based on an occurrence of the one or more predetermined qualifying events;
    verifying, using the processor, the occurrence of the one or more predetermined qualifying events by:
    generating a questionnaire personalized to the user using at least one third party data source;
    presenting the questionnaire to the user, via a smart phone interface provided on the user's smartphone device;
    receiving, by the processor, a response to the questionnaire sent from the user's smart phone and verifying, without user intervention, the occurrence of the one or more predetermined qualifying events as identified by the user by using an event software verifier module coupled to the processor and at least one electronic data source by comparing a response to the generated questionnaire with data from the at least one electronic data source;
    providing, in the user's smart phone interface, from the processor, a recommendation to the user to dispose the funds of the certificate of deposit prior to the maturity date without penalty fees responsive to verifying the occurrence of the one or more predetermined qualifying events;
    receiving, by the processor, a reply from the user in response to the recommendation and instructing a disposition of funds from the certificate of deposit; and
    coordinating, by the processor, a disposition of the funds of the certificate of deposit prior to the maturity date in response to the reply from the user.

2. The computer-implemented method as recited in claim 1, wherein the at least one electronic data source includes a third party data source relative to the user and the financial institution.

3. The computer-implemented method as recited in claim 1, wherein analyzing and decrypting includes analyzing the received encrypted data and at least one service provided to the user by the financial institution.

4. The computer-implemented method as recited in claim 1, wherein the first and second software modules are associated with the financial institution.

5. The computer-implemented method of claim 1, further including receiving an option agreement entered into by a user with a financial institution.

6. The computer-implemented method of claim 5, wherein the option agreement specifies one or more predetermined qualifying events enabling disposition of funds of a certificate of deposit prior to the maturity date of the certificate of deposit.

7. The computer-implemented method of claim 1, wherein an early termination fee is waivable at the discretion of the financial institution.

8. The computer-implemented method of claim 5, wherein an interest rate associated with the certificate of deposit is specified by the option agreement.

9. The method of claim 5, wherein the received option agreement further covers one or more additional certificates of deposit associated with one or more third party.

10. A computer system for administrating a certificate of deposit associated with a financial institution for a user, comprising:
    a memory configured to store instructions;
    a processor disposed in communication with said memory, wherein said processor upon execution of the instructions is configured to:
    receive, in a first software module, user entered data from a user's smart phone, wherein the first software module is configured to identify one or more predetermined qualifying events for disposing funds of a certificate of deposit prior to a maturity date of the certificate of deposit;
    receive, in a second software module, encrypted data of the user entered data from the first software module, wherein the one or more predetermined qualifying events comprise one or more qualifying life events;
    analyze and decrypt, in the second software module, without user intervention, the received encrypted data, to determine the user's eligibility for disposition of funds of the certificate of deposit prior to the maturity date, without penalty fees, based on an occurrence of the one or more predetermined events;
    verify the occurrence of the one or more predetermined events by:
    generating a questionnaire personalized to the user using at least one third party data source;
    presenting the questionnaire to the user, via a smart phone interface provided on the user's smartphone device;
    receiving a response to the questionnaire sent from the user's smart phone and verifying without user intervention, the occurrence of the one or more predetermined qualifying events as identified by the user by using an event software verifier module coupled to the processor and at least one electronic data source by comparing a response to the generated questionnaire with data from the at least one electronic data source;
    wherein the processor, upon executing the instructions stored in the memory, is further configured to:
    provide, in the user's smart phone interface, a recommendation to the user to dispose the funds of the certificate of deposit prior to the maturity date without penalty fees responsive to verifying the occurrence of the one or more predetermined qualifying events;
    receive, by the processor, a reply from the user in response to the recommendation and instructing a disposition of funds from the certificate of deposit; and
    coordinate, by the processor, a disposition of the funds of the certificate of deposit prior to the maturity date in response to the reply from the user.

11. The computer system as recited in claim 10, wherein the at least one electronic data source includes a third party data source relative to the user and the financial institution.

12. The computer system as recited in claim 10, wherein analyzing and decrypting includes analyzing the received encrypted data and at least one service provided to the user by the financial institution.

13. The computer system as recited in claim 10, wherein the first and second software modules are associated with the financial institution.

14. The computer system as recited in claim 10, wherein the processor is further configured to receive an option agreement entered into by a user with a financial institution.

15. The computer system as recited in claim 14, wherein the option agreement specifies one or more predetermined qualifying events enabling disposition of funds of a certificate of deposit prior to the maturity date of the certificate of deposit.

16. The computer system as recited in claim 10, wherein an early termination fee is waivable at the discretion of the financial institution.

17. The computer system as recited in claim 14, wherein an interest rate associated with the certificate of deposit is specified by the option agreement.

18. The computer system as recited in claim 14, wherein the received option agreement further covers one or more additional certificate of deposit associated with one or more third party.

* * * * *